United States Patent [19]
Kobayashi

[11] Patent Number: 5,996,787
[45] Date of Patent: *Dec. 7, 1999

[54] CASES FOR ACCOMMODATING DISC CARTRIDGES

[75] Inventor: Daiki Kobayashi, Miyagi, Japan

[73] Assignee: Sony Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/063,054

[22] Filed: Apr. 21, 1998

[30] Foreign Application Priority Data

Apr. 22, 1997 [JP] Japan ................................. 9-104101

[51] Int. Cl.⁶ .................................................. B65D 85/57
[52] U.S. Cl. ....................................... 206/308.3; 312/9.64
[58] Field of Search ................................ 206/309, 308.1, 206/308.3, 387.15; 211/40, 41.12; 312/9.64

[56] References Cited

U.S. PATENT DOCUMENTS

| | | | |
|---|---|---|---|
| 4,289,235 | 9/1981 | Egly | 206/387.15 |
| 4,312,548 | 1/1982 | Posso | 206/387.15 |
| 4,676,372 | 6/1987 | Rager | 206/308.3 |
| 4,684,019 | 8/1987 | Egly | 206/308.3 |
| 4,776,457 | 10/1988 | Ferraroni | 206/308.3 |
| 4,776,463 | 10/1988 | Press | 206/308.3 |
| 5,402,896 | 4/1995 | Gould et al. | 206/309 |
| 5,411,135 | 5/1995 | Danzyger et al. | 206/308.3 |
| 5,590,827 | 1/1997 | Nimpoeno | 206/308.1 |
| 5,617,949 | 4/1997 | De Koning et al. | 206/308.3 |

*Primary Examiner*—Jim Foster
*Attorney, Agent, or Firm*—Rader, Fishman & Grauer; Ronald P. Kananen

[57] ABSTRACT

A case for accommodating a disc cartridge includes a main body or cartridge accommodating part, a cartridge support arranged in the main body and including steps with increasing heights in due order, and partition plates arranged in the main body and corresponding to the steps of the cartridge support. Right and left sides of the disc cartridge inserted in the main body are held between side faces of the cartridge support and between the partition plates.

13 Claims, 10 Drawing Sheets

CASES FOR ACCOMMODATING DISC CARTRIDGES

BACKGROUND OF THE INVENTION

The present invention relates generally to cases for accommodating disc cartridges, and more particularly, to the cases which enable accommodation of disc cartridges in a standing way and in a file.

FIGS. 10A–11B show two different types of the known cases for accommodating disc cartridges (referred hereafter to as cartridge cases), which enable accommodation of disc cartridges in a standing way and in a file.

Figure 10A:
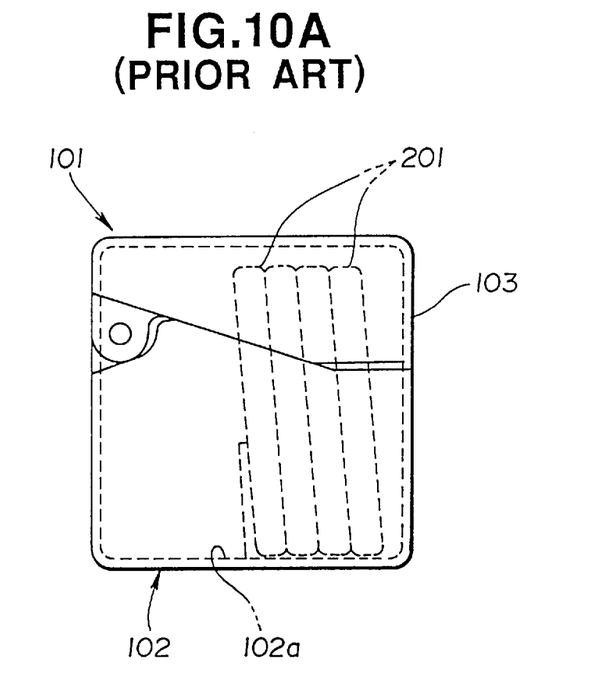
FIG. 10A is a side view showing one known cartridge case.
Figure 10B:
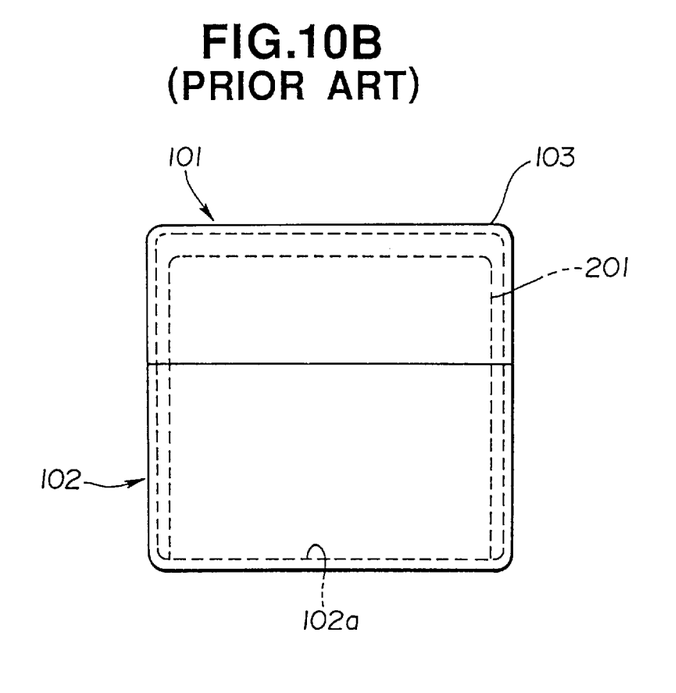
FIG. 10B is a front view showing the known cartridge case.

With a cartridge case 101 as shown in FIGS. 10A–10B, a bottom 102a of a case main body or cartridge accommodating part 102 is formed flat to allow accommodation of disc cartridges 201 with the heights being equalized. Reference numeral 103 designates a rotary lid.

Figure 11A:
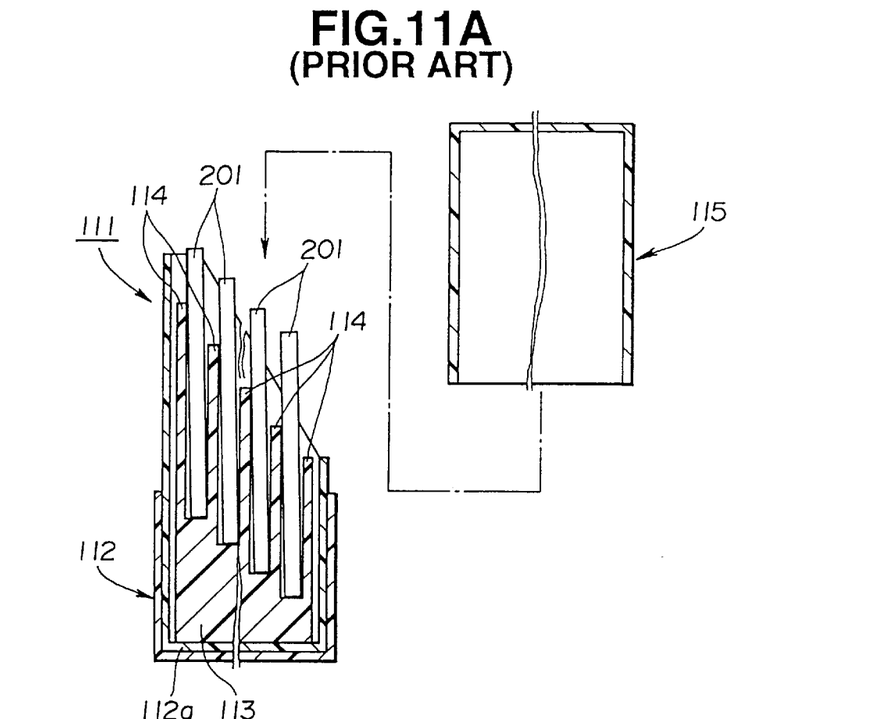
FIG. 11A is a view similar to FIG. 2, showing another known cartridge case.
Figure 11B:
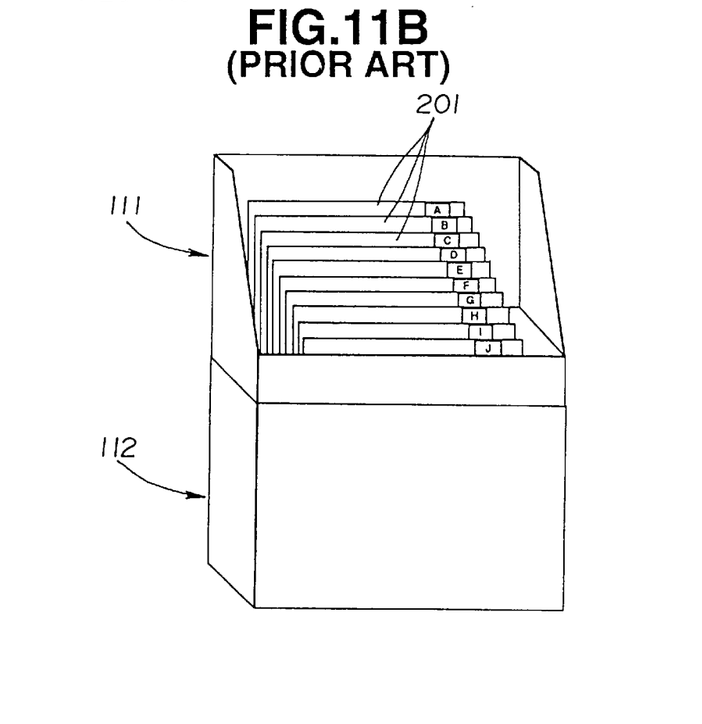
FIG. 11B is a view similar to FIG. 9, showing the known cartridge case.

With a cartridge case 111 as shown in FIGS. 11A–11B, a stepped cartridge support 113 and partition plates 114 are arranged on a bottom 112a of a cartridge accommodating part 112 to allow accommodation of disc cartridges 201 with the heights being varied stepwise. Reference numeral 115 designates an engaged lid.

With the cartridge case 101 as shown in FIGS. 10A–10B, since the heights of the disc cartridges 201 accommodated therein are equalized, the case height can be reduced. However, since the rear disc cartridge 201 is concealed by the front disc cartridge 201, it is only the foremost disc cartridge 201 that can be identified.

On the other hand, with the cartridge case 111 as shown in FIGS. 11A–11B, since the heights of the disc cartridges 201 accommodated therein are varied stepwise, not only the foremost disc cartridge 201 but the rear disc cartridges 201 can be identified. However, each disc cartridge 201 are loosely received between the partition plates 114, so that each disc cartridge 201 is shaken between the partition plates 114 to produce noise by colliding with the partition plate 114, etc. when carrying the cartridge case 111, or it is jumped out when the cartridge case 111 falls down.

It is, therefore, an object of the present invention to provide cases for accommodating disc cartridges, which allow sure holding of disc cartridges with easy identification thereof.

SUMMARY OF THE INVENTION

One aspect of the present invention lies in providing a case for accommodating a disc cartridge, comprising:
  a main body having side walls and a bottom;
  a cartridge support arranged in said main body, said cartridge support including steps with increasing heights in due order; and
  partition plates arranged in said main body, said partition plates corresponding to said steps of said cartridge support,
  first and second sides of the disc cartridge inserted in said main body being held between side faces of said cartridge support and between said partition plates.

Another aspect of the present invention lies in providing a case for accommodating a disc cartridge, comprising:
  a main body having side walls and a bottom;
  a cartridge support arranged in said main body, said cartridge support including steps with increasing heights in due order;
  partition plates arranged in said main body, said partition plates corresponding to said steps of said cartridge support, first and second sides of the disc cartridge inserted in said main body being held between side faces of said cartridge support and between said partition plates;
  a lid rotatably mounted to said main body; and
  a restrainer arranged with said lid, said restrainer restraining upward movement of the disc cartridge with said lid closed.

DETAILED DESCRIPTION OF THE INVENTION

Figure 1:
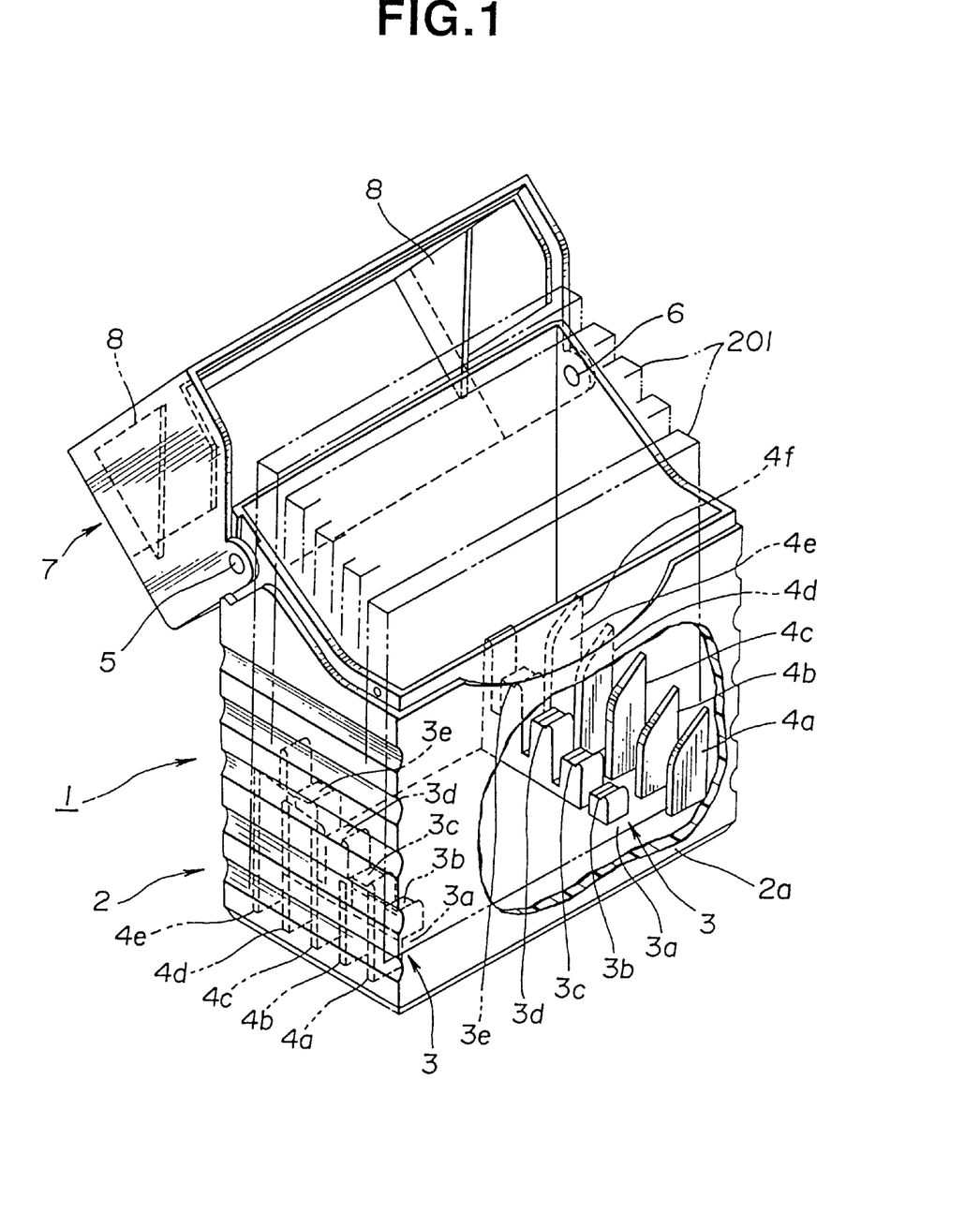
FIG. 1 is a perspective view, partly broken, showing a cartridge case with a lid open embodying the present invention.

Referring to FIG. 1, a case 1 for accommodating disc cartridges (referred hereafter to as cartridge case) embodying the present invention includes a main body or cartridge accommodating part 2 for accommodating disc cartridges 201. Arranged in the cartridge accommodating part 2 are a cartridge support 3 having steps 3a–3e with increasing heights in this order, and partition plates 4a–4e for partitioning the inside of the cartridge accommodating part 2 for every step 3a–3e of the cartridge support 3. It is noted that a bottom 2a of the cartridge accommodating part 2 corresponds to the lowermost step 3a of the cartridge support 3.

Figure 2:
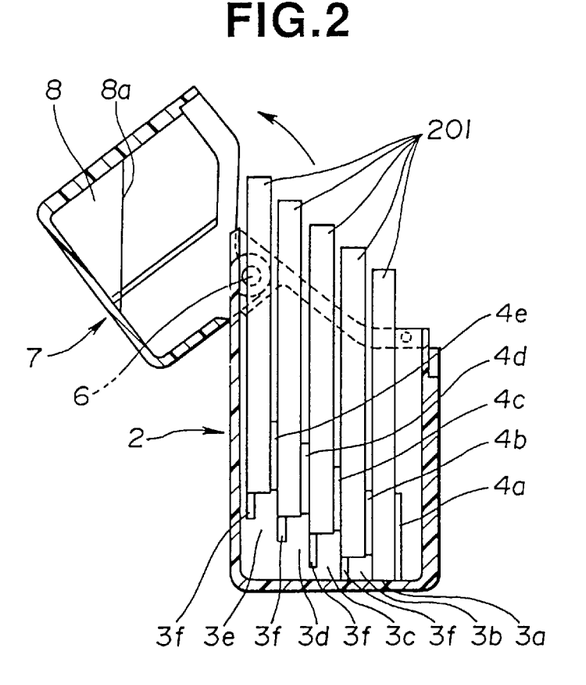
FIG. 2 is a cross section showing the cartridge case.
Figure 3:
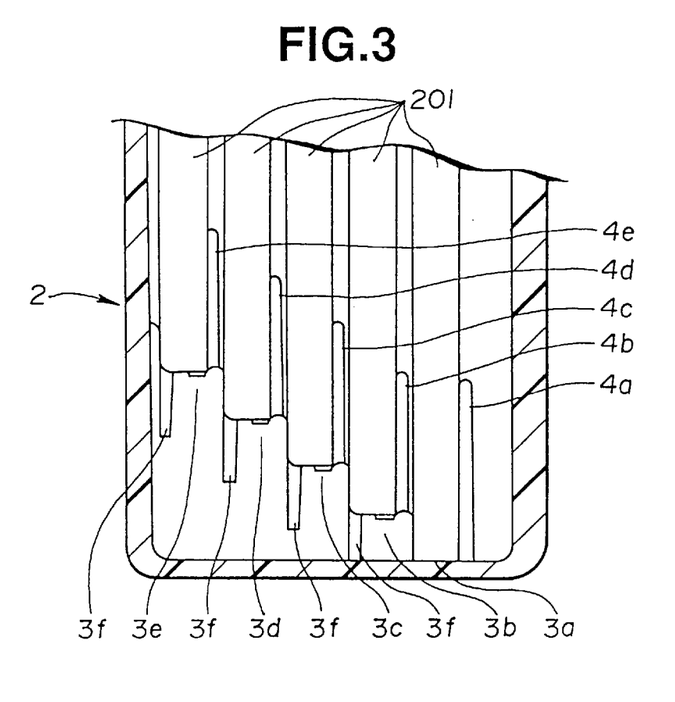
FIG. 3 is a fragmentary enlarged section showing the cartridge case.

Referring to FIGS. 2–3, the right and reverse sides of each disc cartridge 201 accommodated in the cartridge accommodating part 2 are held and supported between the side faces of the cartridge support 3 and between the partition plates 4a–4e. The cartridge support 3 is formed with slits 3f which are arranged behind the steps 3b–3e to provide resilience to the steps 3a–3e and the partition plates 4a–4e.

Figure 4:
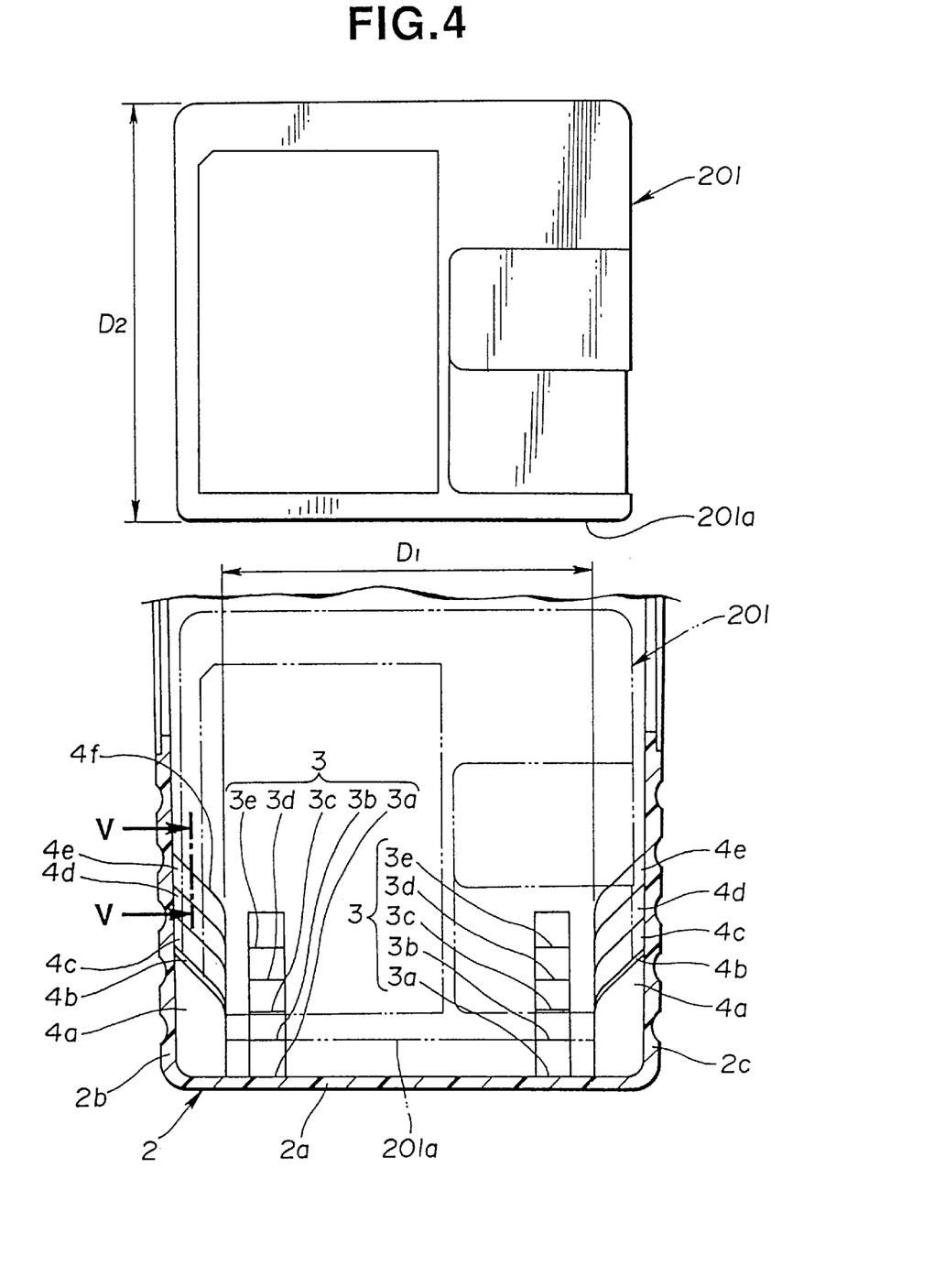
FIG. 4 is a longitudinal section showing the cartridge case.

Referring to FIG. 4, the cartridge support 3 includes right and left portions arranged on the right and left sides of the bottom 2a of the cartridge accommodating part 2 to support the right and left sides of a lower end 201a of each disc cartridge 201 accommodated in the cartridge accommodating part 2.

Each partition plate 4a–4e includes right and left portions oppositely arranged with right and left side faces 2c, 2b of the cartridge accommodating part 2 to hold the right and left portions of the cartridge support 3.

A distance $D_1$ between the right and left portions of each partition plate 4a–4e oppositely arranged with the right and left side faces 2c, 2b of the cartridge accommodating part 2 is smaller than a width $D_2$ of a smaller side of the disc cartridge 201. Thus, referring to FIGS. 6A–6D, the partition plate 4a–4e can hold and support both sides of the disc cartridge 201 even if it is inserted from any of four sides thereof.

As shown in FIG. 1, an upper end 4f of each partition plate 4a–4e is formed like a slant face which gradually inclines toward the bottom 2a of the cartridge accommodating part 2 in proportion to a distance from the side face 2c, 2b of the cartridge accommodating part 2. Thus, when, upon insertion of the disc cartridge 201 into the cartridge accommodating part 2, the lower end 201a of the disc cartridge 201 contacts the upper end 4f of the partition plate 4a–4e, the disc cartridge 201 is led to the bottom 2a of the cartridge accommodating part 2 along the slant face of the upper end 4f of the partition plate 4a–4e.

Figure 5:
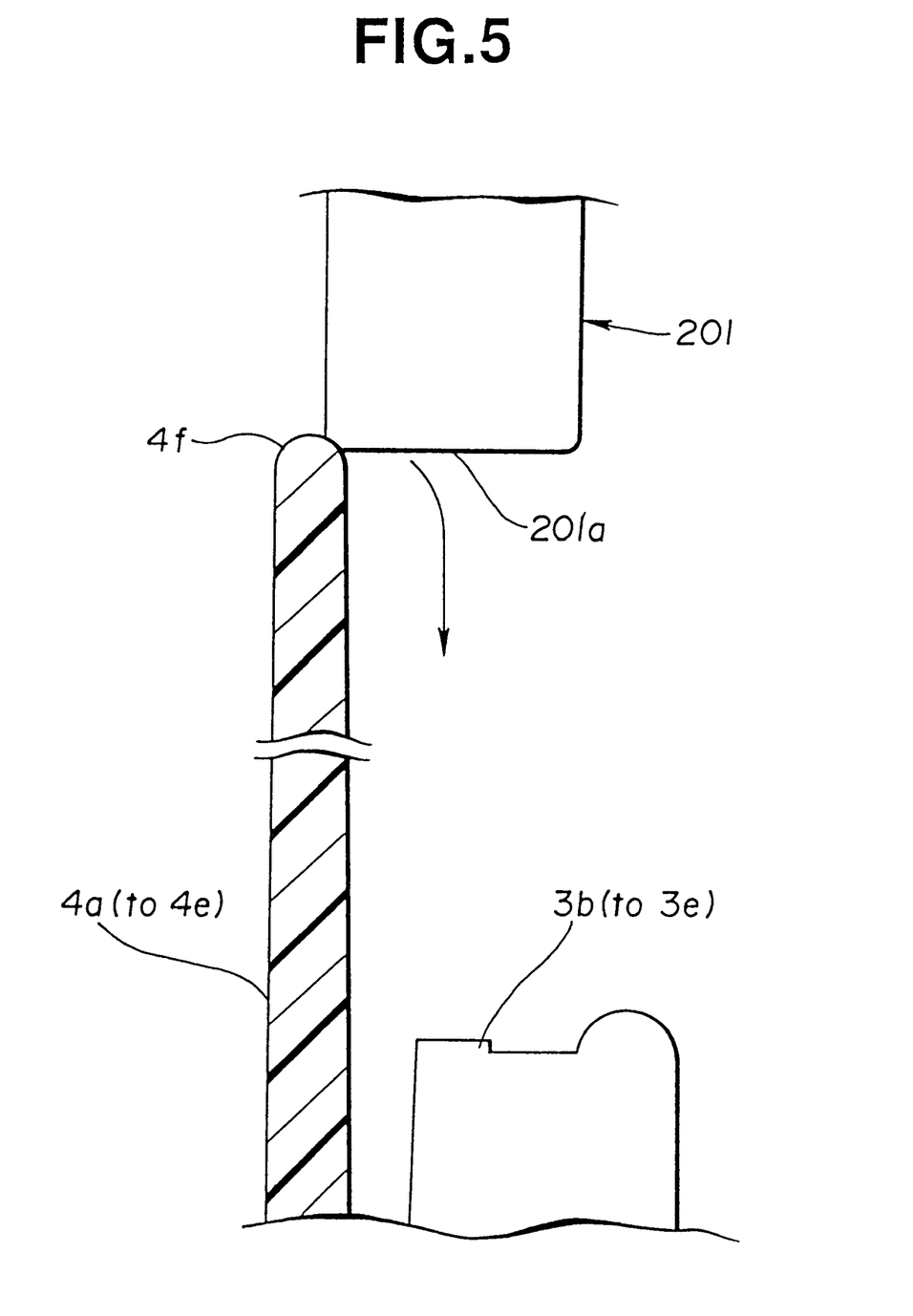
FIG. 5 is a sectional view taken along the line V—V in FIG. 4.
Figures 6A, 6B:
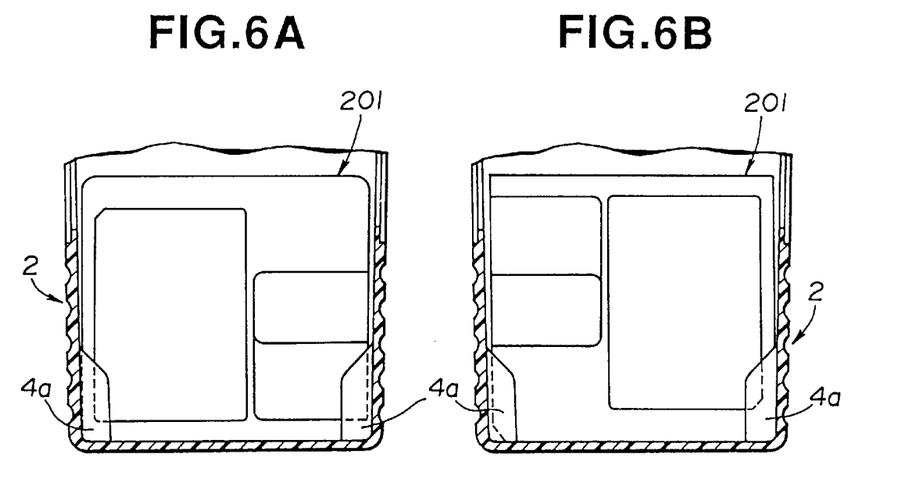
FIGS. 6A–6D are schematic views showing disc cartridges inserted in the cartridge case from four different sides thereof.
Figures 6C, 6D:
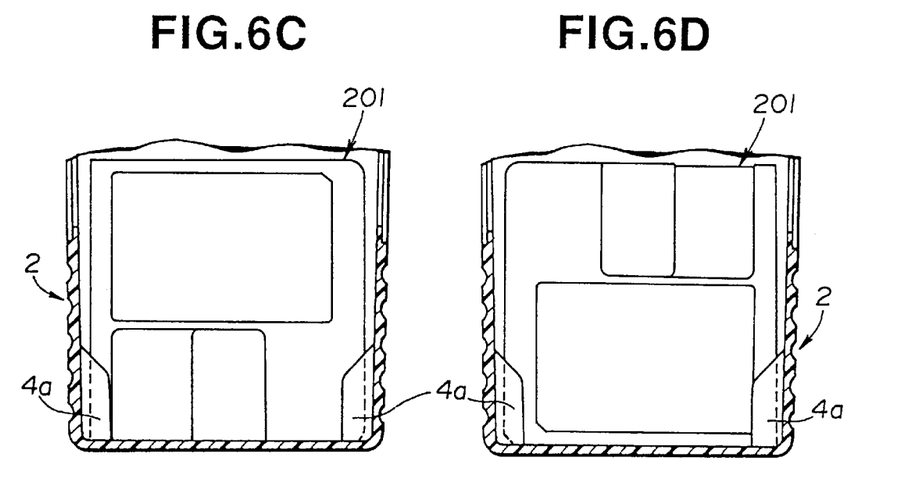

Referring to FIG. 5, the upper end 4f of the partition plate 4a–4f is formed like a circular or triangular face which has as the top a center portion as viewed in the direction of thickness. After the lower end 201a of the disc cartridge 201 contacts the upper end 4f of the partition plate 4a–4e, the disc cartridge 201 is smoothly moved downward toward the step 3a–3e of the cartridge support 3.

As best seen in FIG. 1, a lid 7 is rotatably mounted to the cartridge accommodating part 2 through shafts 5, 6 to close an opening of the cartridge accommodating part 2. The lid 7 includes a cartridge upward-movement restrainer 8 which restrains upward movement of the disc cartridges 201 accommodated in the cartridge accommodating part 2 when the lid 7 closes the opening thereof.

Figure 7:
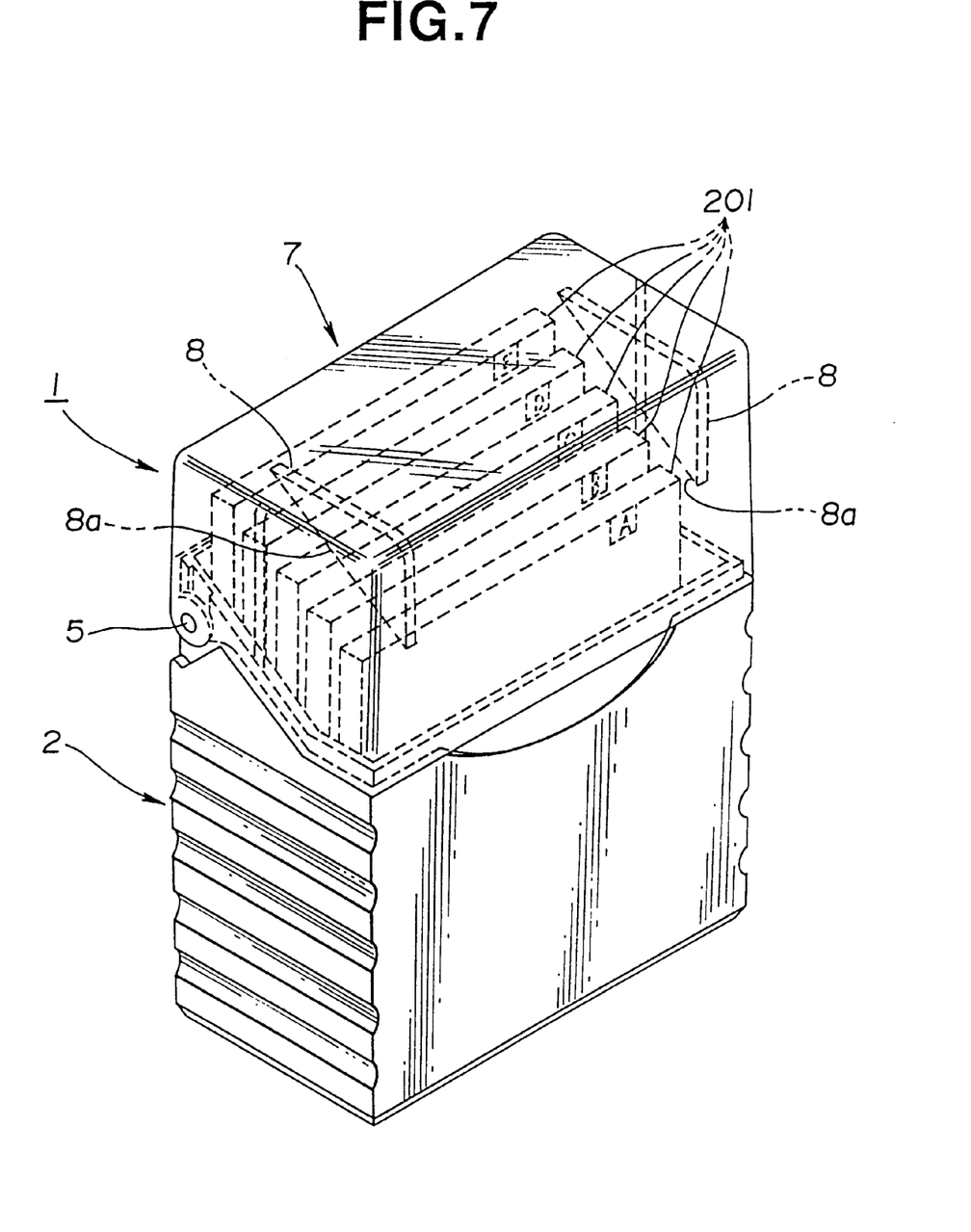
FIG. 7 is a view similar to FIG. 1, showing the cartridge case with the lid closed.

The cartridge upward-movement restrainer 8 includes right-triangular plate ribs arranged on right and left sides of the inner surface of the lid 7. Referring to FIG. 7, when the lid 7 closes the opening of the cartridge accommodating part 2, a base 8a of the cartridge upward-movement restrainer 8 is positioned above the disc cartridges 201 accommodated stepwise in the cartridge accommodating part 2 with a slight clearance with respect to the upper ends of the disc cartridges 201. If the disc cartridges 201 begin to move upward, the base 8a of the cartridge upward-movement restrainer 8 presses down the upper ends of the disc cartridges 201 to prevent them from slipping through the side faces of the steps 3a–3e of the cartridge support 3 and the partition plates 4a–4e.

The cartridge accommodating part 2 is formed out of transparent plastic such as acrylic resin including poly (methyl methacrylate), acrylonitrile-butadiene-styrene copolymer (ABS), polycarbonate, polystyrene or the like. The cartridge support 3 and the partition plates 4a–4e are integrated with the cartridge accommodating part 2.

The lid 7 is formed out of the same plastic as that of the cartridge accommodating part 2. The cartridge upward-movement restrainer 8 is integrated with the lid 7.

With the cartridge case 1 constructed as described above, when inserting the disc cartridges 201 into the cartridge accommodating part 2, they are disposed on the steps 3a–3e of the cartridge support 3, and are held and supported between the side faces of the cartridge support 3 and between the partition plates 4a–4e. Therefore, the disc cartridges 201 may not rattle in the cartridge accommodating part 2.

When disposing the disc cartridges 201 on the steps 3a–3e of the cartridge support 3, the upper ends of the disc cartridges 201 protrude successively from the foremost to the rearmost as shown in FIG. 7. Thus, placing of identification labels 21 on the protruded upper ends or previous coloring of the disc cartridges 201 in different colors enables identification of all of the disc cartridges 201 accommodated in the cartridge case 1.

Having described the present invention in connection with the preferred embodiment, it is noted that the present invention is not limited thereto, and various changes and modifications can be made without departing from the scope of the present invention.

By way of example, in the embodiment, the cartridge support 3 is integrated with the cartridge accommodating part 2. Alternatively, the cartridge support 3 may be formed separately from the cartridge accommodating part 2.

Figure 8:
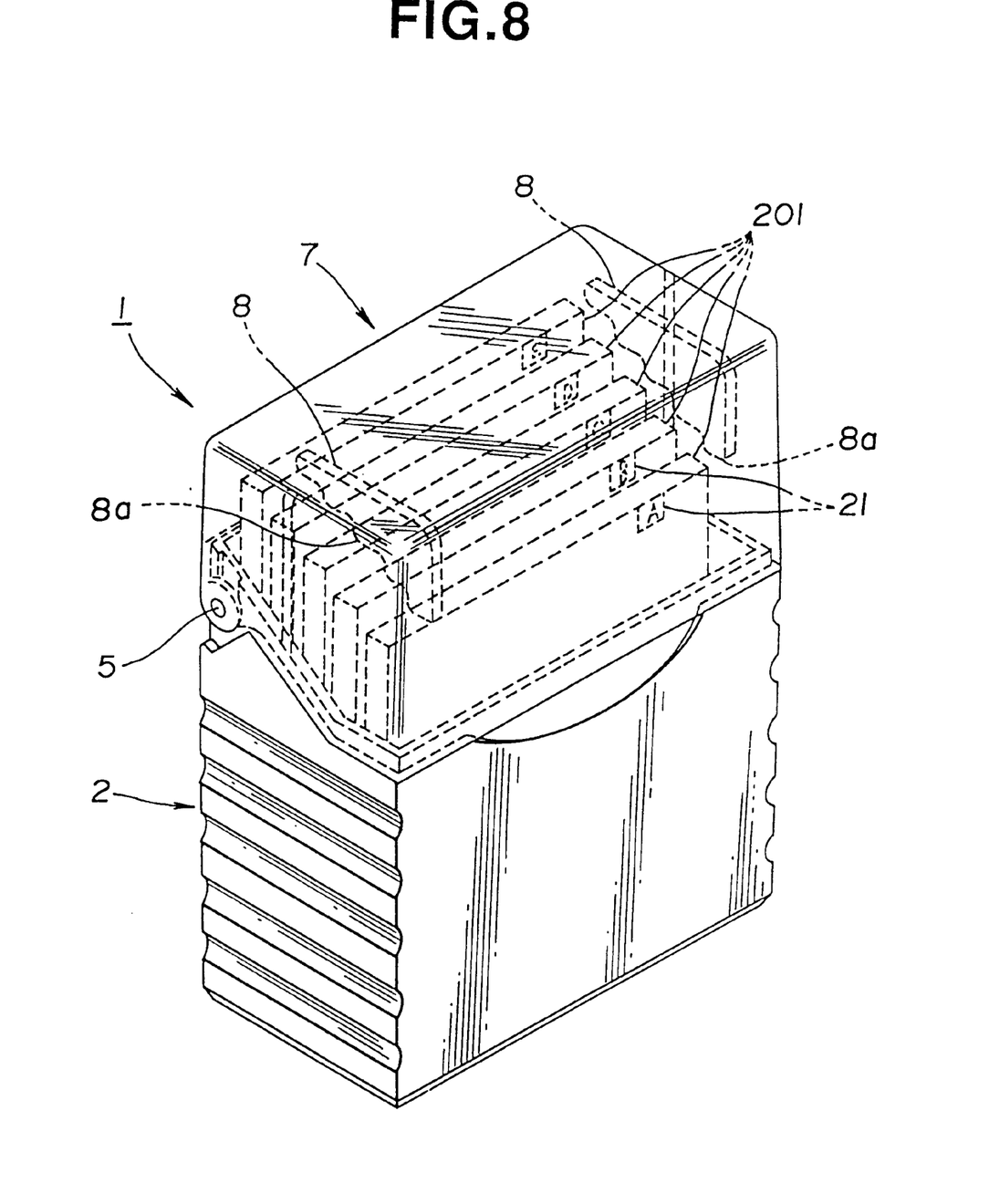
FIG. 8 is a view similar to FIG. 7, showing one variant of a cartridge upward-movement restrainer.
Figure 9:
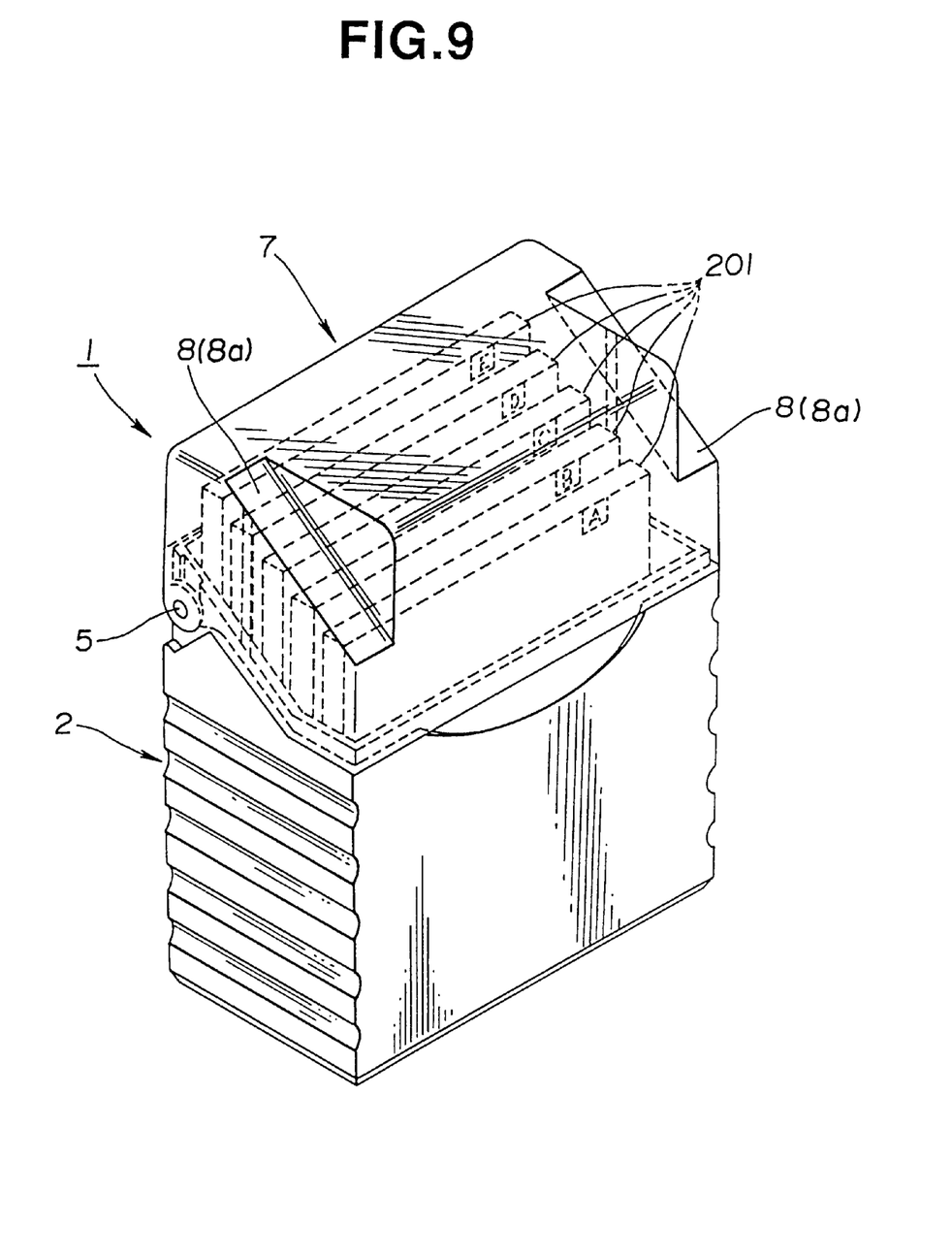
FIG. 9 a view similar to FIG. 8, showing another variant off the cartridge upward-movement restrainer.

Moreover, referring to FIG. 8, the base 8a of the disc cartridge upward-movement restrainer 8 may be formed stepwise to correspond to the upper ends of the disc cartridges, or referring to FIG. 9, it may be formed by denting both sides of the lid 7 into a slant face.

What is claimed is:

1. A case for accommodating a disc cartridge, comprising:

a main body having side walls and a bottom;

a cartridge support arranged in said main body;

said cartridge support including steps with increasing heights in due order and at least one slit formed in at least a portion of said cartridge support;

partition plates arranged in said main body, said partition plates corresponding to said steps of said cartridge support, said partition plates including an upper end formed like a slant face which gradually inclines toward said bottom of said main body in proportion to a distance from said side walls of said main body, first and second sides of the disc cartridge inserted in said main body so as to support first and second sides of a lower end of the disc cartridge.

2. A case as claimed in claim 1, wherein said cartridge support includes first and second portions arranged on first and second sides of said bottom of said main body so as to support first and second sides of a lower end of the disc cartridge.

3. A case as claimed in claim 1, wherein each partition plate includes first and second portions oppositely arranged with said side walls of said main body so as to hold said cartridge support.

4. A case as claimed in claim 3, wherein a distance between said first and second portions of each partition plate is smaller than a width of a smaller side of the disc cartridge.

5. A case as claimed in claim 4, wherein said upper end of said partition plate is formed like a predetermined face which has as the top a center portion as viewed in a direction of thickness of said partition plate.

6. A case as claimed in claim 1, further comprising:

a lid rotatably mounted to said main body; and a restrainer arranged with said lid, said restrainer restraining upward movement of the disc cartridge with said lid closed.

7. A case as claimed in claim 6, wherein said restrainer is arranged inside said lid.

8. A case as claimed in claim 7, wherein said restrainer is arranged outside said lid.

9. A case as claimed in claim 8, wherein said restrainer is formed like a slant face.

10. A case as claimed in claim 9, wherein said restrainer is formed stepwise.

11. A case for accommodating a disc cartridge as claimed in claim 1, wherein the slits provide resiliency to said steps.

12. A case for accommodating a disc cartridge, comprising;

a main body having side walls and a bottom;

a cartridge support arranged in said main body, said cartridge support including steps with increasing heights in due order and at least one slit formed in at least a portion of said cartridge support;

partition plates arranged in said main body, said partition plates corresponding to said steps of said cartridge support, said partition plates including an upper end formed like a slant face which gradually inclines toward said bottom of said main body in proportion to a distance from said side walls of said main body, first and second sides of the disc cartridge inserted in said main body being held between side faces of said cartridge support and between said partition plates;

a lid rotatably mounted to said main body; and a restrainer arranged with said lid, said restrainer restraining upward movement of the disc cartridge with said lid closed.

13. A case for accommodating a disc cartridge as claimed in claim 12, wherein the slits provide resiliency to said steps.

\* \* \* \* \*